Fig. I.

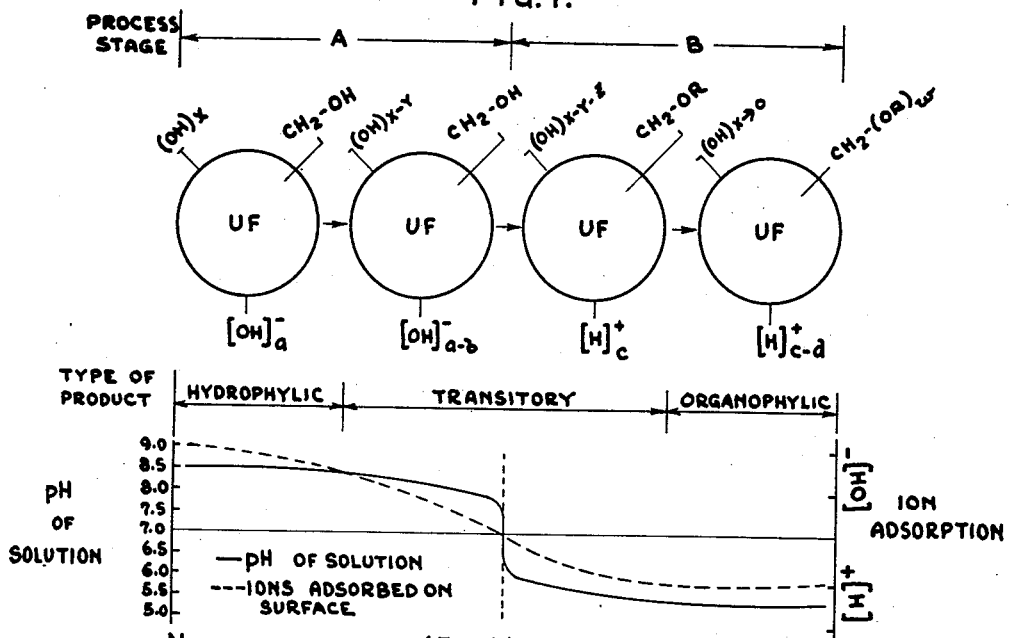

Nomenclature (Fig. I.)

- $X$ = NUMBER OF METHYLOL HYDROXYL GROUPS.
- $Y$ = NUMBER OF METHYLOL HYDROXYL GROUPS LOST DUE TO PRIMARY REACTION.
- $Z$ = NUMBER OF METHYLOL HYDROXYL GROUPS LOST DUE TO SECONDARY REACTION.
- $a$ = NUMBER OF ADSORBED HYDROXYL IONS.
- $b$ = NUMBER OF ADSORBED HYDROXYL IONS LOST DUE TO INCREASED ACIDITY i.e., pH- GRADIENT.
- $c$ = NUMBER OF ADSORBED HYDROGEN IONS.
- $d$ = NUMBER OF ADSORBED HYDROGEN IONS LOST DUE TO REDUCED IONIZATION IN ORGANIC MEDIA.
- $w$ = NUMBER OF MOLS OF ALCOHOL CHEMICALLY COMBINED AS INDICATED BY ALCOXY CONTENT SEE FORMULA FOR CALCULATION IN TEXT AND TABLE I FOR VALUES.
- $R$ = ALKYL GROUP OF MONOHYDRIC ALCOHOL e.g., $-C_4H_9$ IN THE CASE OF BUTYL ALCOHOL.

Inventors
T. S. HODGINS
P. S. HEWETT,
By Munson H. Lane
Attorney

Patented June 5, 1945

2,377,422

UNITED STATES PATENT OFFICE 2,377,422

ALCOHOL MODIFIED UREA-FORMALDEHYDE CONDENSATION PRODUCTS AND PROCESS OF PRODUCING SAME

Theodore S. Hodgins and Philip Stanley Hewett, Royal Oak, Mich., assignors to Reichhold Chemicals, Inc., Detroit, Mich.

Application August 16, 1941, Serial No. 407,198

4 Claims. (Cl. 260—70)

This invention relates to new and useful products and process for the production of resinous condensation products produced from urea, formaldehyde and alcohols.

To our knowledge, these products and process have never before been described. We are aware of Hönel, Serial No. 373,053, filed January 3, 1941, now Patent No. 2,350,894, dated June 6, 1944, who describes resinous condensation products produced from urea, formaldehyde and alcoholic compounds, but he specifically states that his process is inoperative at urea formaldehyde ratios of less than 1/2.5. Siegel, Serial No. 401,343, July 7, 1941, now Patent No. 2,322,979, dated June 29, 1943, who describes also alcohol modified urea-formaldehyde resins states "The aqueous formaldehyde solution should be applied in excess of the amount which can be combined chemically by urea. This is at least 2.5 molecules formaldehyde for 1 molecule of urea."

Our invention is based on the discovery that new, useful and economical products can be produced at urea-formaldehyde ratios of less than 1/2.5. Specifically, we prefer to operate in the range of urea-formaldehyde ratios of 1/2.3 to 1/2.0 for technical reasons which will be developed later in this specification.

I. VARIABLES AFFECTING THE ALCOHOL MODIFIED UREA-FORMALDEHYDE CONDENSATION REACTIONS

We consider three aggregations of matter in the alcohol modified urea formaldehyde condensation reactions. (See Fig. 1.)

1. Hydrophylic stage
2. Transitory stage
3. Organophylic stage

The urea-formaldehyde condensation product is hydrophylic up to a point where 50–60% of the water has been removed. As the water is continuously removed the urea formaldehyde condensation product gradually loses its affinity for water and enters the Transitory stage. At this stage the product although not completely soluble in alcohols, can readily be dispersed therein under favorable conditions. In other words, the alcohol and Transitory stage product are emulsified. Upon heating and pH change the product becomes clear and in an excess of the etherifying medium gradually enters the Organophylic stage. The degree, i. e., solubility of the Organophylic stage measured by its solubility in straight chain hydrocarbons serves to indicate the final properties of the modified urea-formaldehyde condensation product.

Factors which determine the reaction rate and type of product formed are: molar ratio of reactants, time, temperature, pressure, pH, molar concentration of etherifying reactant, and solubility.

Our invention resides in the discovery that with proper adjustment of the above mentioned factors, we can produce new valuable, useful, economical and stable products at a molar ratio of urea and formaldehyde of 1/2.0–1/2.3. As the following examples illustrate, we can change one or more variables if due consideration is given to an adjustment of the other inter-related variables.

The invention will be more readily understood by reference to the accompanying diagram (Figure 1) and to tables I, II, III, and IV appearing as part of this specification.

TABLE I

| Exper. No. | U/F | A. Catalyst | Percent $H_2O$ dist. | Alcohol | B. Catalyst | Yield resin, grs. | M. S./10 gs. | Yield/urea | Yield/$CH_2O$ | Alcoxy |
|---|---|---|---|---|---|---|---|---|---|---|
| 1 | 1.0/2.3 | $NH_4OH$ | 99.0 | n-Butyl | $H_3PO_4$ | 675 | 22.0 | 2.58 | 2.25 | 0.594 |
| 2 | 1.0/2.3 | ----do---- | 88.5 | 1-Pentanol | ----do---- | 608 | 35.0 | 2.32 | 2.03 | 0.326 |
| 3 | 1.0/2.3 | ----do---- | 95.0 | n-Octyl | ----do---- | 580 | 21.5 | 2.22 | 1.94 | 0.172 |
| 4 | 1.0/2.2 | ----do---- | 90.2 | n-Butyl | ----do---- | 583 | 27.0 | 2.13 | 1.94 | 0.274 |
| 5 | 1.0/2.2 | ----do---- | 91.5 | Ethanol | ----do---- | 583 | 13.0 | 2.13 | 1.94 | 0.440 |
| 6 | 1.0/2.2 | ----do---- | 93.0 | n-Propyl | ----do---- | 612 | 13.0 | 2.24 | 1.94 | 0.440 |
| 7 | 1.0/2.1 | ----do---- | 86.5 | n-Butyl | ----do---- | 609 | 25.0 | 2.13 | 2.03 | 0.310 |
| 8 | 1.0/2.1 | KOH | 85.0 | ----do---- | HCl | 605 | 23.0 | 2.11 | 2.02 | 0.299 |
| 9 | 1.0/2.1 | $(C_2H_5)_2NH$ | 99.0 | ----do---- | $H_2SO_4$ | 670 | 45.0 | 2.34 | 2.23 | 0.483 |
| 10 | 1.0/2.05 | $NH_4OH$ | 69.0 | ----do---- | $H_3PO_4$ | 2,554 | 18.0 | 2.12 | 2.08 | 0.328 |
| 11 | 1.0/2.05 | ----do---- | 70.0 | ----do---- | HCOOH | 2,606 | 20.0 | 2.17 | 2.12 | 0.362 |
| 12 | 1.0/2.05 | KOH | 73.5 | ----do---- | $HC-C-OOH$ | 2,593 | 21.0 | 2.16 | 2.11 | 0.354 |
| 13 | 1.0/2.05 | $NH_4OH$ | 66.7 | Unrectified/n-butyl | $HC-C-OOH$ $H_3PO_4$ | 2,565 | 19.0 | 2.14 | 2.10 | 0.341 |
| 14 | 1.0/2.0 | ----do---- | 88.2 | n-Butyl | ----do---- | 620 | 19.5 | 2.07 | 2.07 | 0.298 |
| 15 | 1.0/2.0 | NaOH | 85.0 | ----do---- | [phthalic anhydride structure] | 625 | 21.0 | 2.08 | 2.08 | 0.311 |
| 16 | 1.0/2.0 | $NH_4OH$ | 95.0 | n-Octyl | $H_3PO_4$ | 633 | 25.0 | 2.11 | 2.11 | 0.190 |

Referring to the tabulated data in Table I, it can be seen that products produced according to our invention give a much higher yield of resin per pound of formaldehyde than products produced at higher formaldehyde ratios. To illustrate, let us compare resins based on a U/F ratio of 1/3.0 and 1/2.5 with our more economical resins in the range of U/F of 1/2.0–1/2.3.

TABLE II

| U/F ratio | Yield 50% resin/lb. CH$_2$O |
| --- | --- |
| 1/2.0–1/2.3 | 4.14 |
| 1/2.5 | 3.48 |
| 1/3.0 | 2.94 |

The yield per unit weight of urea is approximately constant (see Table I).

Previous methods of producing alcohol modified urea-formaldehyde resins at U/F ratios of less than 1/2.5 have employed the initial preparation of dimethylolurea and subsequent etherification with alcohols. Another approach has been that of Sorenson who prepared the diethers of dimethylolurea, U. S. Patents 2,191,974 (Feb. 27, 1940) and 2,213,921 (Sept. 3, 1940) from which he, in turn, produced resin solutions, U. S. Patent 2,201,926 (May 21, 1940). The production of dimethylolurea usually requires about 24–36 hours at 18–25° C.; the preparation of diethers usually requires 2–4 hours; and resins from diethers may be produced in 4–6 hours which makes a total of 30–46 hours to produce resins through the dimethylolurea process. Our process, on the other hand, requires only 12–18 hours on commercial large scale process, depending upon the particular resin being produced.

In our process the major portion (65–100%) of the water contained in the aqueous formaldehyde added in the A Stage condensation is removed at a low temperature under vacuum (30–100 mm. Hg.). As a result of this procedure, the total time of processing is reduced; it is possible to use the alcohol distilled out in the B stage (etherification) in succeeding batches without rectification due to the fact that it is not contaminated with methyl alcohol, formic acid, formaldehyde, water, etc., which is removed in the A Stage distillation; further, it is possible to use a smaller excess of alcohol which materially shortens the B Stage distillation time which, in turn, results in savings both in raw material and processing costs.

In the A, hydrophylic, stage a pH of 8.0–9.0 is maintained by the use of alkaline reacting catalysts e. g., NH$_4$OH, KOH, NaOH, (C$_2$H$_5$)$_2$NH, pseudo bases, quaternary ammonium compounds, etc. Due to the extreme tendency of the material to exhibit a pH-gradient i. e., an increase in acidity as the condensate approaches the Transitory Stage, it is sometimes necessary to make further additions of alkaline catalyst during the A Stage processing. This is particularly true where ammonium hydroxide is employed. At the beginning of the B, Transitory, stage the pH is adjusted to a value of 5.5–6.0 using acid or acid reacting catalyst e. g., phosphoric acid, hydrochloric acid, sulphuric acid, formic acid, maleic acid, phthalic acid, acid reacting esters or acid reacting salts, etc. We have found that the transition to the organophylic stage is most readily assisted by an acid catalyst.

In the B stage of our process an excess of the etherifying reactant is added to the already nearly anhydrous transitory stage product. This has the effect of increasing the reaction rate from the transitory stage resin to the organophylic stage resin. According to the "Mass Action Law,"

$$A + B \rightleftharpoons C + D$$

where,
A = transitory stage resin (dehydrated)
B = etherifying reactant
C = organophylic product
D = water of reaction, we have established nearly ideal conditions for a high yield of the product C. For example, we have shown that our process gives a 20% increase in yield per unit weight of formaldehyde employed over known processes using a U/F ratio of 1/2.5 and a 40% increase in yield over processes using U/F ratio of 1/3.0. Hence, by initially removing the water from the sphere of reaction, thus increasing the effective molar excess of the alcohol modifying agent in the B stage of the reaction, we have been able to prepare valuable resin solutions compatible with the commonly used paint, varnish and lacquer thinners, resins and pigments. The amount of reacted alcohol, etherification, determines the degree of hydrocarbon tolerance, which is a measure of the molecular size. In general, it can be shown that for a given degree of etherification, "Alcoxy" content, that the hydrocarbon tolerance is directly proportional to the molecular weight of the etherifying alcohol.

TABLE III

| Example No. | Etherifying agent | Molecular weight | Alcoxy | M. S.[1]/per 10 gr. resin |
| --- | --- | --- | --- | --- |
| 1 | n-Butyl alcohol | 74 | 0.594 | 22 |
| 2 | 1-pentanol | 88 | 0.326 | 35 |
| 3 | n-octyl alcohol | 130 | 0.172 | 21.5 |

[1] M. S. = mineral spirits.

II. DISCUSSION OF TEST METHODS AND PROCEDURES

A. SOLID RESIN CONTENT

Weighed 0.8 to 1.0 gram sample of resin solution in a 3 inch flat can top, added 5 ml. xylol and placed in an air circulating oven for 2 hours at 103–104° C.

B. VISCOSITY

The viscosity data given in the examples were measured by the Gardner-Holdt Bubble Standards at 25° C.

C. MINERAL SPIRITS TOLERANCE 10 grams of resin solution was weighed into a 250 ml. beaker and titrated to illegibility of regular newsprint placed under the beaker. The standard mineral spirits employed had a boiling range of 300–400° F.

D. ALCOXY CONTENT (RATIO OF MOLS OF ETHERIFYING AGENT PER MOL UREA)

$$Z = \frac{Y - [u + f - (U \times 18)]}{AU} = \text{Alcoxy content}$$

where,
Y = Solid resin yield
U = mols of urea
A = molecular weight of etherifying alcohol
$u$ = weight of urea
$f$ = weight of CH$_2$O.

III. PERFORMANCE CHARACTERISTICS OF ALCOHOL MODIFIED UREA FORMALDEHYDE RESINS (U/F) = 1/2.0–1/2.3)

In prior known processes, products containing an excess of formaldehyde (UF = 1/2.5–1/3.0), it was believed necessary to have an excess of formaldehyde to obtain maximum stability of the product: Cheetham, Official Digest of Federation Paint & Varnish Production Clubs No. 174, p. 137 (Mar., 1938) states "Soluble clear resins may be prepared by using an excess of formaldehyde and operating under neutral or slightly alkaline conditions so as to convert the urea present as completely and rapidly as possible to dimethylolurea . . ."; Hodgins and Hovey U. S. Patents 2,226,518 (Dec. 24, 1940), 2,227,223 (Dec. 31, 1940), 2,221,708 (Nov. 12, 1940) and 2,222,506 (Nov. 19, 1940).

We have found that products produced according to our invention are extremely stable i. e., a viscosity change of the order of 25% increase after 12 months. This is of the same order of magnitude as the most stable products produced with a large molar excess of formaldehyde according to the above references. Another feature of our products containing a minimum of formaldehyde is the lack of objectional odors when baked at elevated temperatures. This also reduces industrial hazards from the toxicity viewpoint which means that less elaborate and less expensive ventilating systems may be employed for the baking operations. This absence of free formaldehyde also makes it possible to use the resin for dispersing pigments on an open mill; with products containing an excess of formaldehyde such operations are almost an impossibility due to the strong odor of formaldehyde produced.

Our products, when formulated into enamels, give increased gloss and hardness per unit weight of resin employed. In the case of toluidine enamels, less bronzing and better gloss per unit weight of resin was obtained compared to similar products using a higher formaldehyde ratio. Our products compared to products made with excess formaldehyde have a much faster conversion rate under air-drying conditions. The following table gives the Sward hardness for films cast at 0.004 inch on plate glass.

*Formula A*

| | Per cent |
|---|---|
| U/F resin 1/2.0 | 65 |
| Alkyd plasticizer | 34 |
| Acid catalyst | 1 |
| | 100 |

*Formula B*

| | Per cent |
|---|---|
| U/F resin 1/3.0 | 65 |
| Alkyd plasticizer | 34 |
| Acid catalyst | 1 |
| | 100 |

TABLE IV
*Sward hardness*

| Time | Solution A | Solution B |
|---|---|---|
| | Per cent | Per cent |
| ¼ hr | 14 | 4 |
| ¾ hr | 18 | 6 |
| 1¼ hr | 20 | 10 |
| 2 hr | 22 | 12 |
| 3 hr | 26 | 14 |
| 4½ hr | 30 | 18 |
| 5½ hr | 32 | 22 |
| 6½ hr | 32 | 22 |
| 7½ hr | 36 | 26 |
| 8½ hr | 36 | 28 |

As the above Table IV indicates our products have a much more rapid conversion rate than orthodox products which means that enamels based on this resin have more print resistance. Also the same hardness may be obtained in shorter baking schedules in a given formulation.

The following examples serve to illustrate the process of preparing our products:

*EXAMPLE 1.*—(UREA/FORMALDEHYDE RATIO 1.0/2.3, N-BUTYL ALCOHOL)

A. INITIAL CONDENSATION

To 810 grams (10 mols) of aqueous 37% formaldehyde were added 40 grams of 26% aqueous ammonia and 262 grams of urea (4.37 mols). With the material under agitation (pH 8.0–9.0) the temperature was raised from room temperature to 60° C. in 30 minutes and held at 60° C. for 60 minues. Vacuum was applied (30–100 mm. Hg) at a temperature of 50–60° C. and 505 grams of distillate were removed which represents 99% of the water and methyl alcohol contained in the aqueous formaldehyde. The resulting clear (indicating the absence of crystalline or amorphous urea formaldehyde condensation products), viscous mass (viscosity at 25° C., $Z_4$—$Z_6$) was then heated to 90° C.

B. ETHERIFICATION

While increasing the heat to 90° C., 400 grams (5.4 mols) of n-butyl alcohol were added. At 90° C. an additional 400 grams (5.4 mols) of n-butyl alcohol containing 20 grams of 10% phosphoric acid were introduced into the reaction mixture (pH 5.5 to 6.0) and held at refluxing (92° C.) for fifteen minutes. Vacuum was applied (30–100 mm. Hg) at 60° C. and distillation continued until the resulting product had a mineral spirits tolerance of 22 cc./10 grams resin. 550 grams of distillate were collected. During this treatment the temperature rose to 90° C. The resinous mass was then diluted with 150 grams of xylol to give a yield of 1015 grams product at 66.5% solids which equals 675 grams of solid resin having a butoxy content of 0.594 i. e., mols butyl etherified per mol of urea. The product was clear and water-white having a viscosity of $Z$—$Z_1$ at 25° C.

*EXAMPLE 2*—(U/F=1.0/2.3, 1-PENTANOL)

A. INITIAL CONDENSATION 810 grams (10 mols) 37% aqueous formaldehyde
30 grams 26% aqueous ammonia
262 grams (4.37 mols) urea Heat to 60° C. in 30 minutes and hold for 60 minutes. Dehydrate under vacuum (30–100 mm. Hg) at 50–60° C., removing 450 grams of distillate which represents 88.5% of the aqueous portion of the formaldehyde solution. The resulting clear, viscous ($Z_3$ at 25° C.) syrupy product was then heated at 90° C.

B. ETHERIFICATION

While heating at 90° C. 356 grams (4.05 mols) of 1-pentanol were added. At 90° C., 715 grams (8.12 mols) of 1-pentanol were added containing 20 grams of 10% phosphoric acid (pH 5.5–6.0). Distill at 760 mm. Hg to a mineral spirits tolerance of 35 cc./10 grams resin. 850 grams of distillate were collected. The temperature increased to 135° C. during the final stages of distillation. The resinous mass was then diluted with 225 grams of xylol to give a yield of 1216 grams at 50% solids which equals 608 grams of solid resin having a pentoxy content of 0.326, The resinous product was clear, water-white and had a viscosity at 25° C. of R—S.

NOTE.—Similar products were produced using a commercial fraction of amyl alcohols.

EXAMPLE 3.—(U/F=1.0/2.3, N-OCTYL ALCOHOL

A. INITIAL CONDENSATION 810 grams (10 mols) 37% aqueous formaldehyde
40 grams 26% aqueous ammonia
262 grams (4.37 mols) urea Treat in a similar manner to Example 1. Distillate removed equals 485 grams which is 95% of aqueous portion of formaldehyde.

B. ETHERIFICATION

Treat in a similar manner to Example 1, but use 74 grams (1 mol) butyl alcohol and 221 grams (1.7 mols) of octyl alcohol when heating to 90° C. and 1050 grams (8.1 mols) octyl alcohol containing 20 grams of 10% phosphoric acid at 90° C. The product was distilled at 30–40 mm. Hg to a mineral spirits tolerance of 21.5 cc./10 grams resin. 753 grams of distillate were collected. The resinous mass was diluted with 150 grams of xylol to give a yield of 1100 grams at 52.7% solids which equals 580 grams of solid resin having an octoxy content 0.172. The water-white resinous product had a viscosity of Z at 25° C.

EXAMPLE 4.—(U/F=1.0/2.2, N-BUTYL ALCOHOL

A. INITIAL CONDENSATION 810 grams (10 mols) 37% aqueous formaldehyde
40 grams 26% aqueous ammonia
273 grams (4.55 mols) urea
pH=8.0–9.0
Distillate removed at 30–100 mm. Hg=460 grams=90.2% aqueous portion of formaldehyde
Viscosity=$Z_4$ at 25° C.

B. ETHERIFICATION 300 grams (4.05 mols) butyl alcohol
800 grams (10.8 mols) butyl alcohol
30 grams 10% phosphoric acid
pH=5.5–6.0
Distillate removed at 760 mm. Hg=950 grams
Mineral spirits tolerance=27 cc./10 gram resin
Xylol added to thin=200 grams
Yield=1240 grams at 47% solids=583 grams resin
Butoxy content=0.274
Color=water-white
Viscosity at 25° C.=TT—U

EXAMPLE 5.—(U/F=1.0/2.2, ETHANOL

A. INITIAL CONDENSATION 810 grams (10 mols) 37% aqueous formaldehyde
40 grams 26% aqueous ammonia
273 grams (4.55 mols) urea
pH=8.0–9.0
Distillate removed at 30–100 mm. Hg=465 grams=91.5% removed
Viscosity $Z_4$ at 25° C.

B. ETHERIFICATION 300 grams (6.52 mols) ethanol
1000 grams (21.75 mols) ethanol
30 grams 10% phosphoric acid
pH=5.5–6.0
Distillate removed at 760 mm. Hg=1025 grams
Mineral spirits tolerance=13 cc./10 gram resin
Xylol added=200 grams
Yield=1295 grams at 45% solids=583 grams resin
Ethoxy content=0.440
Color=water-white
Viscosity at 25° C.=N—O

EXAMPLE 6.—(U/F=1.0/2.2, N-PROPYL ALCOHOL

A. INITIAL CONDENSATION

Initial condensation stage same as Example 4, but 475 grams of water removed equals 93%.

B. ETHERIFICATION 300 grams (5 mols) n-propyl alcohol
20 grams 10% phosphoric acid
700 grams (11.67 mols) n-propyl alcohol
pH=5.5–6.0
Distillate removed at 760 mm. Hg=965 grams
Mineral spirits tolerance=13 cc./10 grams resin
Xylol added=200 grams
Yield=1155 grams at 53% solids=612 grams resin
Propoxy content=0.440
Color=water-white
Viscosity at 25° C.=$Z_5$

EXAMPLE 7.—(U/F=1.0/2.1, N-BUTYL ALCOHOL

A. INITIAL CONDENSATION 810 grams (10 mols) 37% aqueous formaldehyde
40 grams 26% aqueous ammonia
286 grams (4.76 mols) urea
pH=8.0–9.0
Distillate removed at 30–100 mm. Hg equals 440 grams equals 86.5%

B. ETHERIFICATION 300 grams (4.05 mols) n-butyl alcohol
30 grams 10% phosphoric acid
1000 grams (13.58 mols) n-butyl alcohol
pH=5.5–6.0
Distillate removed at 30–100 mm. Hg=860 grams
Mineral spirits tolerance=25 cc./10 grams resin
Xylol added=200 grams
Yield 1365 at 44.6%=609 grams resin
Butoxy content=0.31
Color=water-white
Viscosity at 25° C.=V

EXAMPLE 8.—(U/F=1.0/2.1, N-BUTYL ALCOHOL)

A. INITIAL CONDENSATION 810 grams (10 mols) 37% aqueous formaldehyde
10 grams 10% aqueous potassium hydroxide
286 grams (4.76 mols) urea
pH=8.0–9.0
Distillate removed 30–100 mm. Hg equals 433 grams equals 85%.

B. ETHERIFICATION 300 grams (4.05 mols) n-butyl alcohol
15 grams 10% hydrochloric acid
1000 grams (13.58 mols) n-butyl alcohol
pH=5.5–6.0
Distillate removed 30–100 mm. Hg=850 grams.
Mineral spirits tolerance=23 cc./10 grams resin
Xylol added=200 grams
Yield=1211 at 50%=605 grams resin
Butoxy=0.299
Color=water-white
Viscosity at 25° C.=Z—$Z_1$

EXAMPLE 9.—(U/F=1.0/2.1, N-BUTYL ALCOHOL)

A. Initial Condensation 810 grams (10 mols) 37% aqueous formaldehyde
1.3 grams diethylamine
286 grams (4.76 mols) urea
pH=8.0–9.0
Distillate removed at 30–100 mm. Hg equals 504 grams equals 99%.

B. Etherification 300 grams (4.05 mols) n-butyl alcohol
13 grams 10% sulphuric acid
1000 grams (13.58 mols) n-butyl alcohol
pH=5.5–6.0
Distillate removed 30–100 mm. Hg=840 grams
Mineral spirits tolerance=45 cc./10 grams resin
Xylol added=200 grams.
Yield=1,490 grams at 45%=670 grams resin
Butoxy=0.483
Color=water-white
Viscosity at 25° C.=G—H

EXAMPLE 10.—(U/F=1.0/2.05, N-BUTYL ALCOHOL)

A. Initial Condensation 3321 grams (41 mols) 37% aqueous formaldehyde
180 grams 26% aqueous ammonia
1200 grams (20 mols) urea
pH=8.0–9.0
Distillate removed at 30–100 mm. Hg equals 1450 grams equals 69%

B. Etherification 2000 grams (27 mols) n-butyl alcohol
100 grams 10% phosphoric acid
4800 grams (65 mols) n-butyl alcohol
pH=5.5–6.0
Distillate removed 30–100 mm. Hg=5500 grams
Mineral spirits tolerance=18 cc./10 gr. resin
High solvency naphtha=1150 grams
Yield=5108 grams at 50%=2554 grams resin
Butoxy=0.328
Color=Water-white
Viscosity at 25° C.=Z—$Z_1$

EXAMPLE 11.—(U/F=1.0/2.05, N-BUTYL ALCOHOL)

A. Initial Condensation

Same as Example 10, but 1467 grams removed by vacuum distillation equals 70%.

B. Etherification 2000 grams (27 mols) n-butyl alcohol
75 grams 10% formic acid
4800 grams (65 mols) n-butyl alcohol
pH=5.5–6.0 (Note.—Additional formic acid added during vacuum distillation to maintain this pH due to volatilization of formic acid).
Distillate removed 30–100 mm. Hg=5000 grams
Mineral spirits tolerance=20 cc./10 grams resin
Toluol added=1200 grams
Yield=5212 grams at 50%=2606 grams resin
Butoxy=0.362
Color=water-white
Viscosity at 25° C.=U—V

EXAMPLE 12.—(U/F=1.0/2.05, N-BUTYL ALCOHOL)

A. Initial Condensation

Same as Example 10, but 38 grams of 10% potassium hydroxide were used instead of 180 grams of 26% ammonia and 1540 grams distillate removed by vacuum distillation equals 73.5%.

B. Etherification 2000 grams (27 mols) n-butyl alcohol
8 grams maleic acid
4800 grams (65 mols) n-butyl alcohol
pH=5.5–6.0
Distillate removed 30–100 mm. Hg=5200 grams
Mineral spirits tolerance=21 cc./10 grams resin
Xylol added=1200 grams
Yield=5186 at 50%=2593 grams resin
Butoxy=0.354
Color=water-white
Viscosity at 25° C.=V—W

EXAMPLE 13.—(U/F=1.0/2.05, UNRECTIFIED BUTYL ALCOHOL)

A. Initial Condensation

Same as Example 10, but 1400 grams removed by vacuum distillation equals 66.7%.

B. Etherification

In this example unrectified butyl alcohol from previous examples was employed to demonstrate how the alcohol distillate from one batch may be used in a succeeding batch. (Analysis shows this water saturated butyl alcohol to be approximately 80% n-butyl alcohol.)

2500 grams (27 mols dry basis) unrectified butyl alcohol distillate
2000 grams (21.7 mols dry basis) unrectified butyl distillate
100 grams 10% phosphoric acid
5630 grams (61 mols dry basis) unrectified butyl alcohol distillate
pH=5.5–6.0
Distillate removed 30–100 mm. Hg=9230 grams
Mineral spirit tolerance=19 cc./10 grams resin
Xylol added=1150 grams
Yield=5700 grams at 45%=2565 grams resin
Butoxy=0.341
Color=water-white
Viscosity at 25° C.=W—X

EXAMPLE 14.—(U/F=1.0/2.0, N-BUTYL ALCOHOL)

A. Initial Condensation 810 grams (10 mols) 37% aqueous formaldehyde
40 grams 26% aqueous ammonia
300 grams (5 mols) urea
pH=8.0–9.0
Distillate removed at 30–100 mm. Hg=450 grams equals 88.2%

B. Etherification 300 grams (4.05 mols) n-butyl alcohol
30 grams 10% phosphoric acid
1300 grams (17.6 mols) n-butyl alcohol
pH=5.5–6.0
Distillate removed at 30–100 mm. Hg=1200 grams
Mineral spirits tolerance=19.5 cc./10 grams resin
Xylol added=250 grams
Yield=1410 at 44%=620 grams resin
Butoxy=0.298
Color=water-white
Viscosity at 25° C.=T—U

EXAMPLE 15.—(U/F=1.0/2.0, N-BUTYL ALCOHOL)

A. Initial Condensation

Same as Example 14, but using 8 grams of 10% sodium hydroxide instead of 40 grams of aqueous ammonia. Distillate removed 434 grams equals 85%.

B. Etherification

Same as Example 14 (B.) but using 10 grams phthalic anhydride instead of phosphoric acid.
pH=5.5–6.0
Distillate removed at 30–100 mm. Hg. 1185 grams
Mineral spirits tolerance=21 cc./10 grams resin
Xylol added=250 grams
Yield=1390 grams at 45%=625 grams resin
Butoxy=0.311
Color=water-white
Viscosity at 25° C.=U—V

EXAMPLE 16.—(U/F=1.0/2.0, N-OCTYL ALCOHOL)

A. Initial Condensation

Same as Example 14, but 483 grams removed by vacuum distillation equals 95%.

B. Etherification 200 grams (2.7 mols) n-butyl alcohol
300 grams (2.3 mols) n-octyl alcohol
30 grams 10% phosphoric acid
1300 grams (10 mols) n-octyl alcohol
pH=5.5–6.0
Distillate removed 30–100 mm. Hg=1440 grams
Mineral spirits tolerance=25 cc./10 grams resin
Mineral spirits added=250 grams
Yield=1267 at 50%=633 grams resin
Octoxy=0.190
Color=water-white
Viscosity at 25° C.=$Z_1$—$Z_2$ Note.—Similar products were produced using commercial octyl alcohol fractions marketed under the trade names of B–23 and B–24 octyl fractions. These fractions contain 50–60% octyl alcohols and the remainder higher alcohol and ketones.

We claim:

1. The process of producing clear, stable, water-white hydrocarbon soluble rapidly heat-convertible alcohol modified urea formaldehyde resinous condensation products, which comprises heat reacting one mol of urea with 2.0 to 2.3 mols of aqueous formaldehyde at a pH between 8.0 to 9.0 with an alkaline reacting catalyst, subjecting the mass to distillation under a pressure of 30 to 100 mm. Hg until 65 to 100% of the water is removed and a clear viscous syrupy mass is produced, reacting the viscous mass with an excess of a monofunctional primary alcohol in the presence of an acidic catalyst at a pH of 5.5 to 6.0, and subjecting the mass to distillation under a pressure of 30–760 mm. Hg until the resulting resinous mass will tolerate 10 to 50 cc. straight chain hydrocarbon per 10 grams of resin.

2. A process as set forth in claim 1 wherein the viscous syrupy mass is reacted with butyl alcohol.

3. A process as set forth in claim 1 wherein the viscous syrupy mass is reacted with pentanol.

4. A process as set forth in claim 1 wherein the viscous syrupy mass is reacted with octyl alcohol.

THEODORE S. HODGINS.
PHILIP STANLEY HEWETT.